Oct. 11, 1927.  
V. F. ZAHODIAKIN  
INTERNAL COMBUSTION ENGINE  
Filed Nov. 25 1925
1,644,907
6 Sheets-Sheet 1
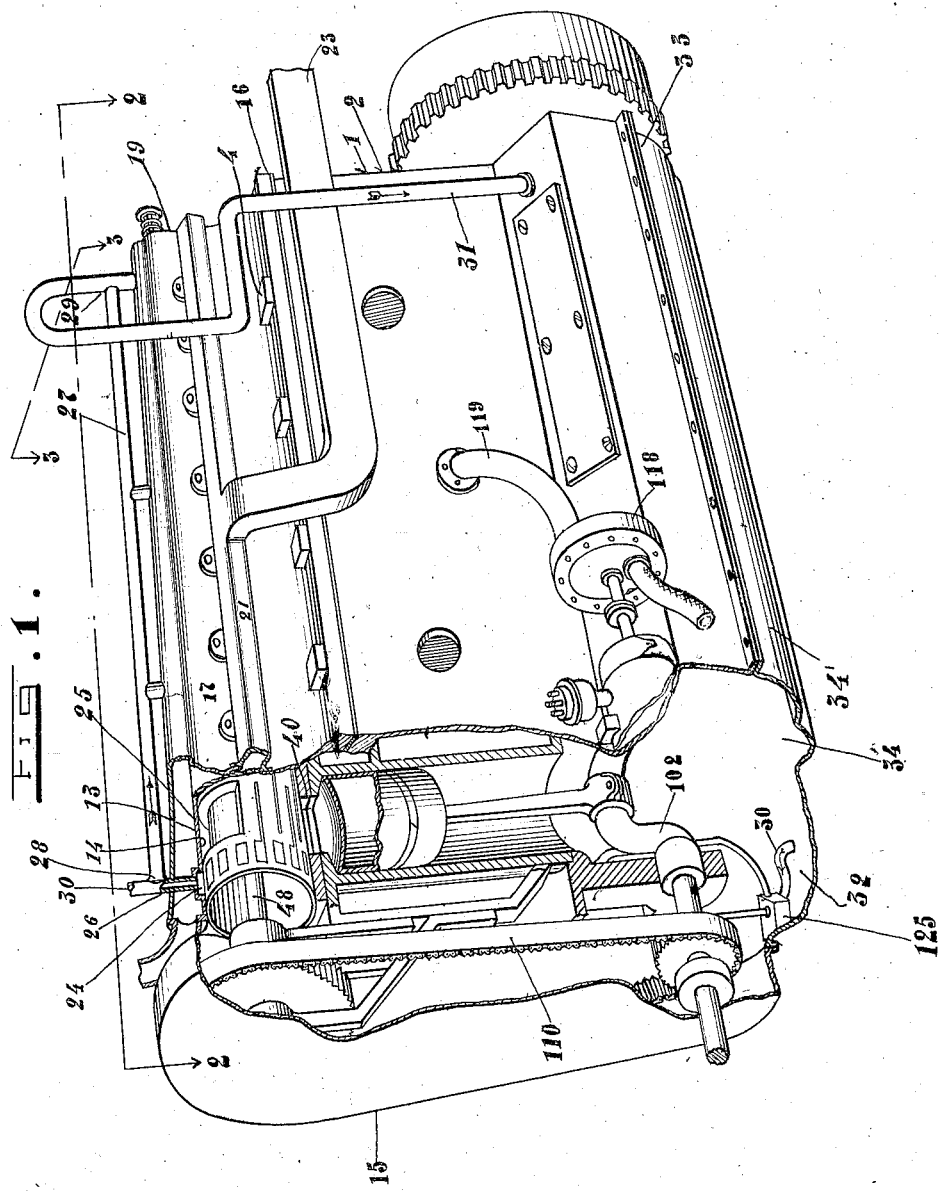
INVENTOR.
Victor F. Zahodiakin
BY
Leo. N. Parker.
ATTORNEY

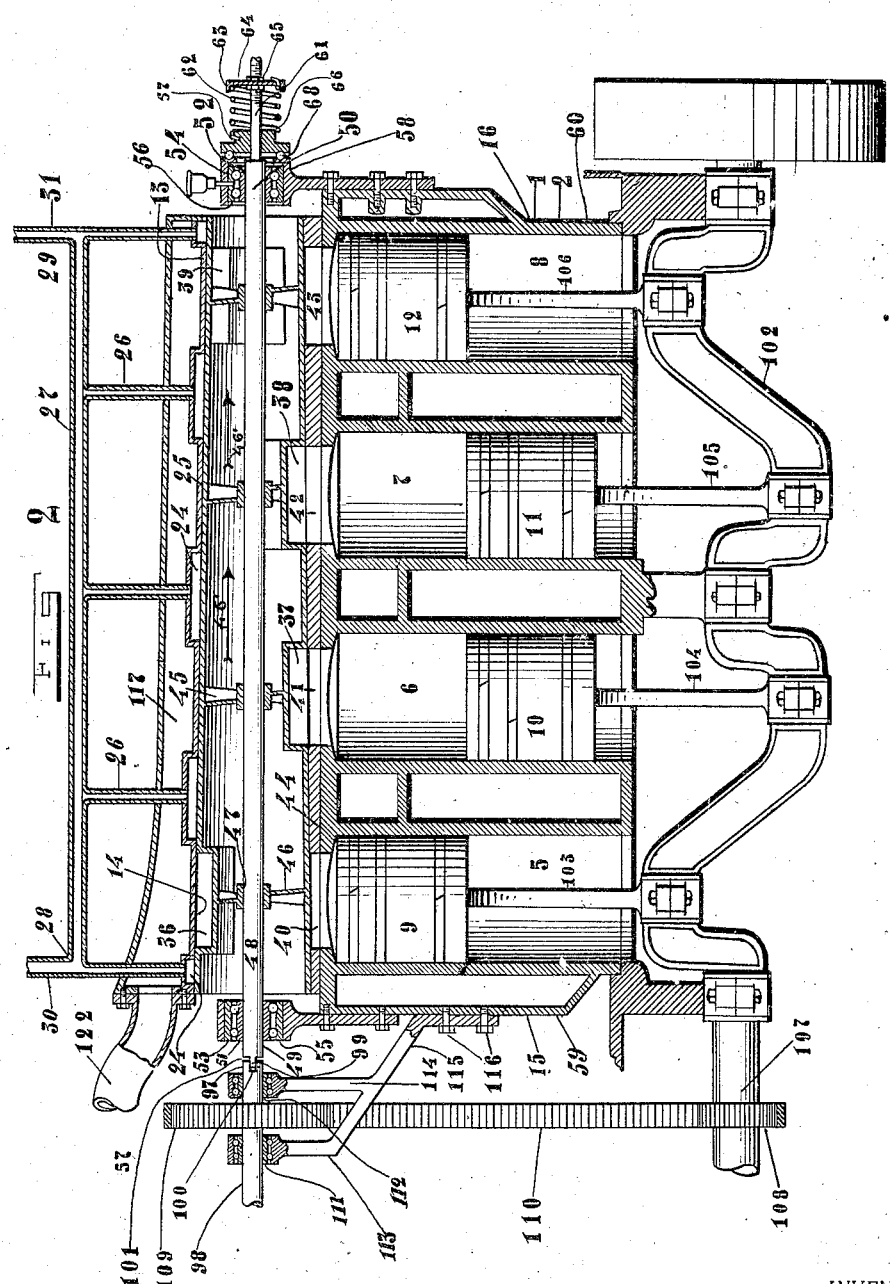

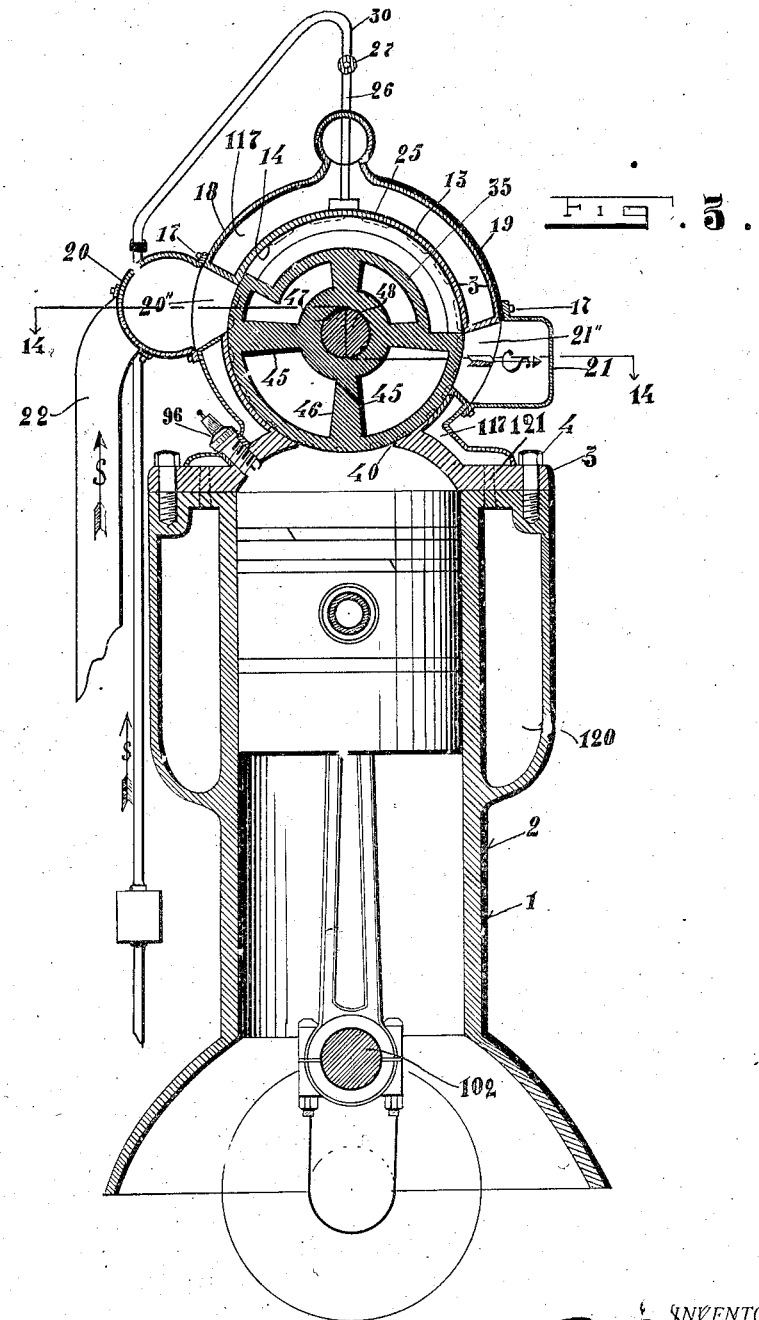

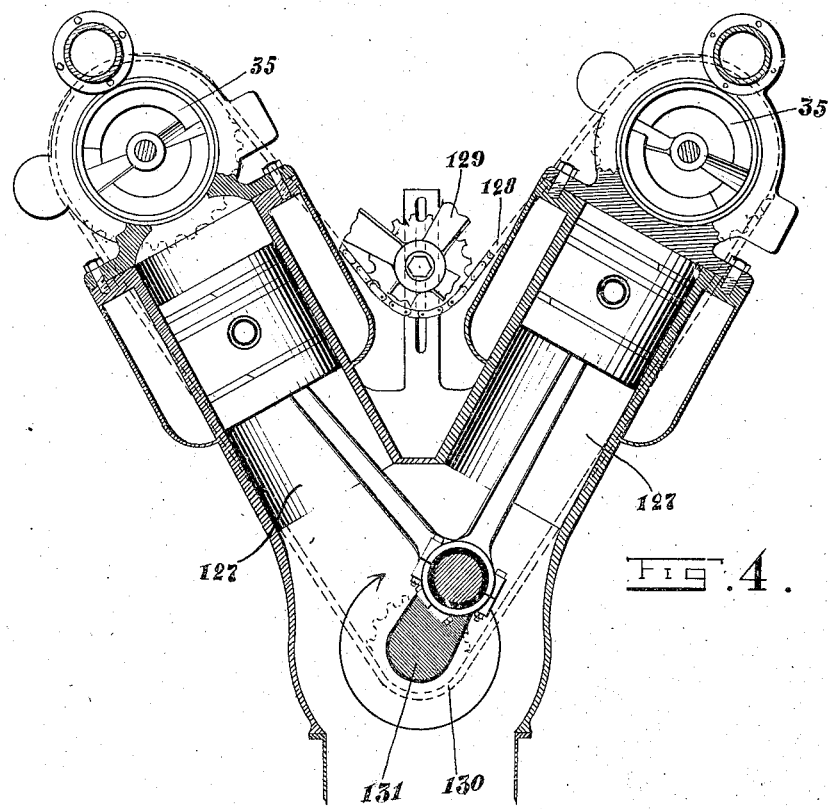
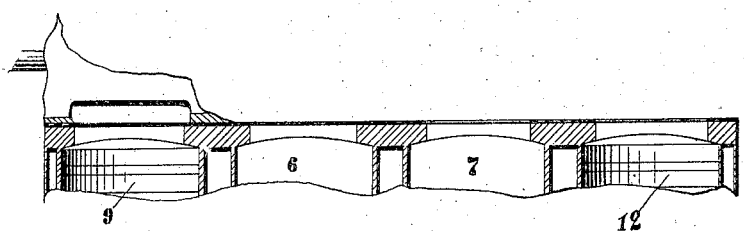

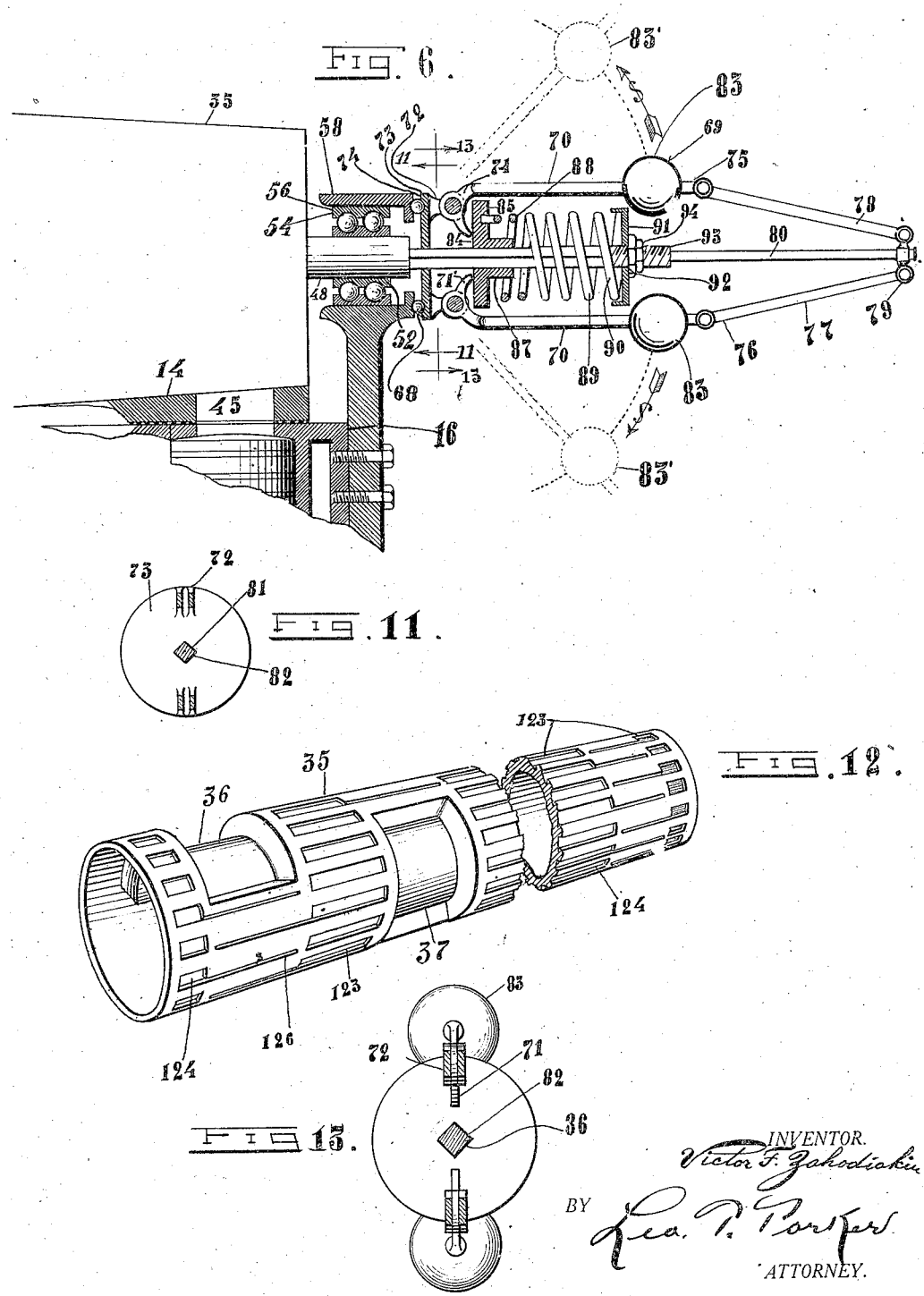

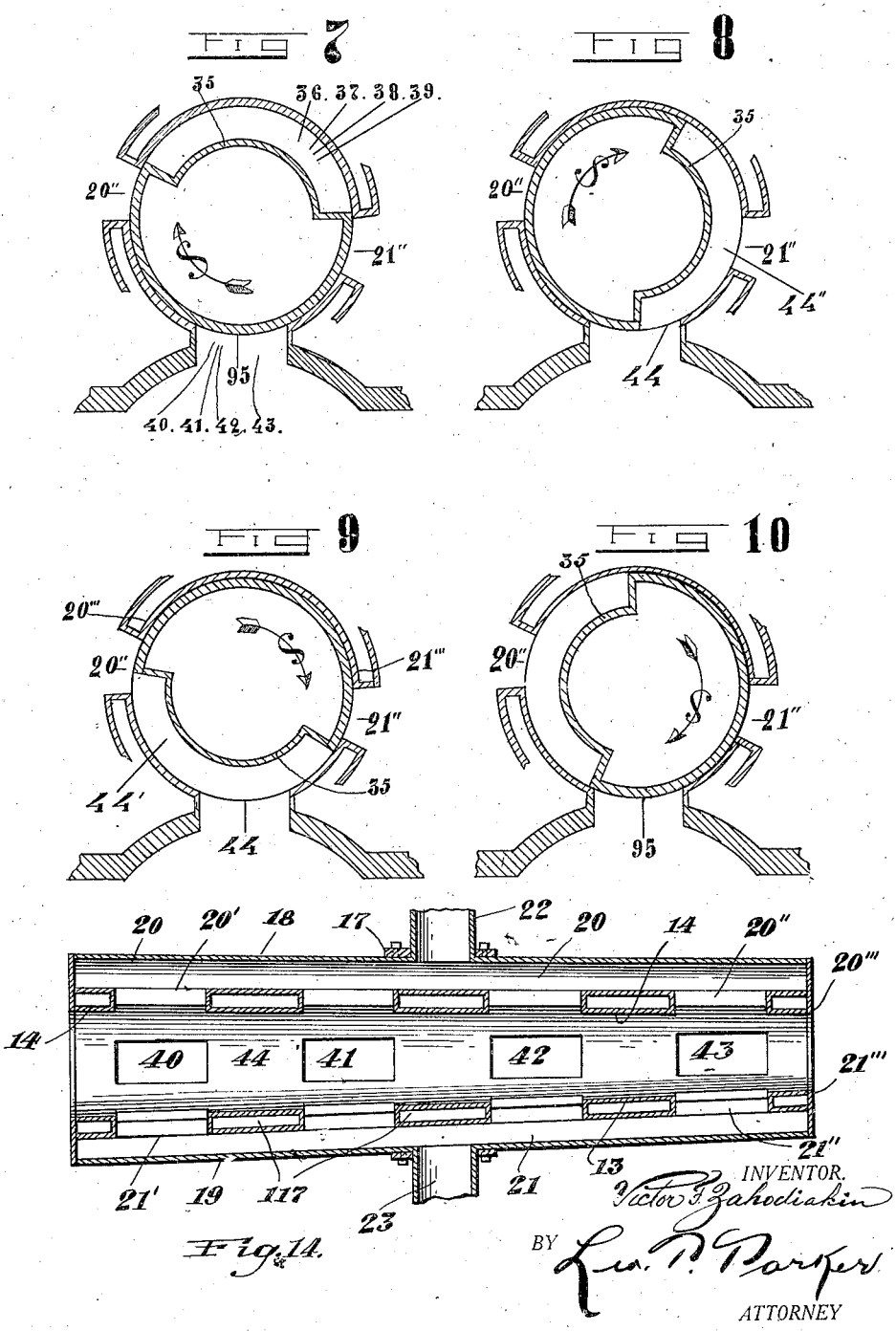

Patented Oct. 11, 1927.

1,644,907

UNITED STATES PATENT OFFICE.

VICTOR F. ZAHODIAKIN, OF NORWOOD, OHIO, ASSIGNOR OF ONE-THIRD TO JOHN A. SCANLON, TRUSTEE, OF CINCINNATI, OHIO.

INTERNAL-COMBUSTION ENGINE.

Application filed November 25, 1925. Serial No. 71,404.

My invention relates to internal combustion engines and more particularly to automatic tapered valve mechanism therefor.

The objects of the invention are to provide simple, efficient, economical and durable means for controlling the delivery and ejection of gases to and from the cylinders of an internal combustion engine; to provide means whereby the use of cams, push rods, tappet valves, springs and the like may be obviated, thereby importantly simplifying the construction of said engine; to provide means adapted to render said engine positive of action, silent while operating, self-cleaning, durable and effective for the purpose of creating maximum power by providing for better combustion of the gases, reducing the necessary power required to introduce the vaporized fuel within the cylinders and exhaust the burned gases therefrom; to provide efficient means adapted to maintain the compression within the cylinders; to provide means adapted to permit the valve to automatically adjust itself to the expansion, contraction and wear thereby insuring a true bearing for said valve, whereby the danger of said valve sticking within its chamber or casing, due to an overheated engine and like reasons, is eliminated; to provide means whereby said engine is adapted to operate smoothly with minimum vibration of its parts; to provide simple, efficient and practical means for cooling the valves; and to provide simple and dependable means for introducing oil upon the bearing surface of said valve to insure its effectual lubrication.

The invention consists in providing an engine head primarily comprising a valve casing having a tapered bearing and having ports leading into the cylinders of the engine and having inlet and exhaust passages; in providing a rotatable tubular tapered valve mounted in said bearing and having a plurality of spaced apart indentions therein in staggered relation to each other, said indentions adapted to cooperate with the corresponding cylinder ports and the inlet and exhaust passages in the valve casing for effecting operation of said engine; in providing webs in the form of air suction means within said valve and positioned in vertical alignment with said cylinders to maintain a continuous flow of air through the valve while the engine is operating and to support the walls of said valve; in providing a shaft extending longitudinally through said valve and to which said valve is fixed, and said shaft being mounted in bearings slidable longitudinally of said valve; in providing resilient means to automatically force said valve longitudinally of said casing and maintain uniform pressure of said valve in its tapered seat or bearing; and in providing the exterior surface of said valve with a series of grooves into which lubricant is forced under pressure for insuring lubrication of the valve bearing.

My invention, further, consists in the combination, arrangement of the parts and in the details of the construction, as herein set forth and claimed:

In the drawings:

Fig. 1 is a perspective view of the invention with parts broken away;

Fig. 2 is a longitudinal central vertical section taken on a line corresponding to 2—2 in Fig. 1 and showing parts broken away;

Fig. 3 is a transverse vertical section taken on a line corresponding to 3—3 in Fig. 1 and showing parts broken away;

Fig. 4 is a transverse vertical section showing a modified form of the invention with parts broken away;

Fig. 5 is a longitudinal central vertical section of the invention with parts broken away and showing the pistons in oppositely disposed positions as shown in Fig. 2;

Fig. 6 is a longitudinal central vertical section showing a modified form of the resilient valve controlling means adaptable for use on engines having changeable rates of rotation;

Fig. 7 is a transverse vertical section of the valve and casing with parts broken away and showing the valve in position for maintaining compression in the cylinder during the explosion cycle of the engine;

Fig. 8 is a transverse vertical section of the valve and casing, with parts broken away, and showing the valve in cooperative position with the exhaust passage and the cylinder port;

Fig. 9 is a transverse vertical section of the valve and casing, with parts broken away, and showing the valve in cooperative position with the intake passage and the cylinder port;

Fig. 10 is a transverse vertical section of the valve and casing with parts broken away and showing the valve in position for maintaining compression in the cylinder during the compression cycle of the engine;

Fig. 11 is a section taken on a line corresponding to 11—11 in Fig. 6;

Fig. 12 is a perspective view of the valve with parts broken away;

Fig. 13 is a vertical section taken on a line corresponding to 13—13 in Fig. 6; and Fig. 14 is a transverse horizontal section taken on a line corresponding to 14—14 in Fig. 3.

In the preferred construction of the invention I provide internal combustion engine 1 comprising usual engine block 2 having engine head 3 fixed thereto by bolts 4. The block 2 is provided with usual cylinders 5, 6, 7 and 8 into which is fitted usual reciprocating pistons 9, 10, 11 and 12. The engine head 3 primarily consists of valve casing 13 which extends horizontally and longitudinally of the head and has bearing 14 slightly tapered from front 15 to rear 16 of the engine. Extending longitudinally of head 3 and fixed by bolts 17 to its sides 18 and 19 are inlet and exhaust pipes or passages 20 and 21, respectively, having open sides 20' and 21'. The pipes 20 and 21, respectively, have pipes 22 and 23 integrally connected therewith which, respectively, lead to a usual carburetor (not shown) and to a usual exhaust pipe muffler (not shown). Communicating with pipes 20 and 21, respectively, are inlet passages and exhaust passages 20" and 21", respectively, in sides 20''' and 21''' of casing 13. The passages 20" and 21" are spaced apart and are in alignment with each other and with the respective indentions in the valve, whereby rotation of the valve causes successive and intermittent communication and intersection of the indentions with passages 20" and 21".

To provide for effective lubrication of bearing 14, the complete lubrication system of which is hereinafter fully explained, a series of spaced apart upwardly extending recesses 24, are formed in top 25 of casing 13. The recesses, respectively, are connected with auxiliary oil supply pipes 26, all of which extend upwardly and are connected with main oil supply pipe 27 extending horizontally and longitudinally of the engine as plainly shown in Figs. 1 and 2. The oil supply pipe 27 has its ends 28 and 29, respectively, connected with inlet and outlet pipes 30 and 31, respectively, leading to the front and rear 32 and 33 of oil reservoir 34 in crank case 34'.

Rotatably mounted in bearing 14 of casing 13 is tubular tapered valve plug 35 having a series of staggered indentions 36, 37, 38 and 39, respectively, positioned in alignment with ports 40, 41, 42 and 43 leading through bottom 44 of casing 13 into cylinders 5, 6, 7 and 8 of engine block 2, whereby when valve 35 is rotated in its bearing or seat 14 the indentions 36, 37, 38 and 39, respectively, intermittently communicate with ports 40, 41, 42 and 43. It is apparent that the indentions 36, 37, 38 and 39 can be substituted by another construction of the valve for co-operating with the intake and exhaust passages to introduce fuel into the cylinders and discharge burned gases therefrom. The indentions have sufficient width circumferentially of the valve to provide open chambers or passages 44' extending from inlet passages 20" to the corresponding port 40, 41, 42 or 43 whereby when an indention is in the relative position shown in Fig. 9 the vaporized fuel is drawn from inlet pipe 20 through the corresponding and cooperative passage 20" into the corresponding cylinder of the engine. When an indention is in the relative position shown in Fig. 8 the burned gases are discharged from the corresponding cylinder into corresponding passage or chamber 44" and through cooperating exhaust passage 21" into exhaust pipe 21. When an indention is in the relative position shown in Figs. 7 and 10 the corresponding port 40, 41, 42 or 43 of the cylinders is closed during the explosion and compression cycles, respectively, of the engine. The detailed operations of valve 35 and the engine is hereinafter fully explained.

Inside valve 35 are a plurality of spaced apart webs 45 in vertical alignment with the respective cylinders. Each of the webs are formed with fan blades 46 for the combined purpose of supporting the walls of the valve against inward pressure due to the force of the explosions within the cylinders of the engine and to create currents of air in the direction indicated by the arrows 46' through the valve for maintaining a relative low temperature of the valve and its bearing. The center of each of the webs 45 is provided with hole 47 into which shaft 48 is suitably fixed. The outer ends 49 and 50 of the shaft, respectively, are fixed to inner races 51 and 52, respectively, of annular or ball bearings 53 and 54, respectively, having outer races 55 and 56, respectively, slidably mounted (toward or away from the engine) in supports 57 and 58, respectively, fixed to front 59 and rear 60 of engine block 2, whereby valve 35 may be slid longitudinally of its bearing or seat 14 in casing 13, which provision is very important particularly for the reason that the walls of casing 13 are not required to withstand the total pressure or force of the explosions within the cylinders, inasmuch as the shaft 48 is capable of supporting valve 35 independently of casing 13. Furthermore, the valve is permitted to change its seating position to compensate for the expansion, contraction and wear of the ports, and yet the valve is adaptable to maintain a close contacting fit with its bearing 14 in the casing under various conditions to prevent a loss of the compressed vaporized fuel or gases (commonly known as compression) between the valve and its seat, from the engine's cylinder.

For the purpose of providing means to automatically maintain uniform pressure of valve 35 against its seat 14 and which means is especially adaptable for use on stationary or other engines having a uniform rate or rotation, the integral reduced end portion 61 of shaft 48, as shown in Fig. 2 is fitted with compressible coil spring 62 having its outer end 63 in contact with retainer 64 fixed to the shaft as by nuts threaded to the shaft. The coil spring, suitably compressed, has its end 66 in contact with plate 67 separated from support 58 by thrust bearing 68 and slidable on reduced end portion 61 of the shaft, whereby continuous outward pressure is exerted by coil spring 62 on shaft 48, thereby forcing valve 35 in close contact with its seat 14 at all times. Adjustment of retainer 64 inwardly or outwardly by means of the positions of nuts 65 controls the compression of spring 62.

In Fig. 6 I show a modified form of the invention which is especially adaptable for use on engine of changeable speed, such as automobile engines. The governor 69 comprises inner arms 70, respectively, having inner ends 71, respectively, pivoted to ears 72 integral with plate 73 having its inner side 74 in contact with thrust bearing 68 mounted in contact with support 58. The outer ends 75, respectively of arms 70 are pivotally connected with inner ends 76, respectively, of arms 77 having their outer ends 78 pivoted to union 79 slidably mounted on reduced end or guide rod 80 of shaft 48. Rotation of shaft 48 effects rotation of plate 73 having rectangular hole 81 receiving rectangular portion 82 of shaft 48, whereby the centrifugal force of the rotating shaft causes weighted balls 83 to spread thereby pivoting ends 71, respectively, of arms 70 which causes fingers 71', respectively, integral with ends 71 of arms 70, to contact and exert pressure against inner side 84 of plate 85. The plate 85 has rectangular hole 86 therein into which rectangular portion 82 of shaft 48 is slidably mounted. Boss 87, integral with plate 85 is received by end 88 of coil spring 89 fixed to plate 85. The outer end 90 of coil spring 89 is maintained against outward movement as by cup retainer 91 having hole 92 through which is received threaded portion 93 of shaft 48. The retainer 91 is maintained against outward movement as by nuts 94 threaded to threaded portion 93 of the shaft, whereby the speed at which shaft 48 rotates operates governor 69 which controls the compression in coil spring 89 which regulates the force with which valve 35 is maintained in its seat 14, it being apparent that the higher the rotatable speed of shaft 48, up to a certain limit, the greater is the spread of balls 83, from the position shown in full lines to or intermediate the positions of the balls shown in dotted lines at 83' whereby coil spring 89 is proportionally compressed by the pressure of fingers 71' which slide plate 85 outwardly and toward retainer 91.

The force of the explosions in the cylinders 5, 6, 7 and 8 of engine 1 acts against the portions of valve 35 which register with the respective ports when the explosions occur whereby the valve tends to slide longitudinally and move from rear 16 to front 15 of engine 1. The force of the tended longitudinal movement of the valve depends primarily upon three factors, namely: The acted force of the explosions within the cylinders upon the valve, the frequency of the explosions within the cylinders and the taper of the valve. In both forms of the invention shown in Figs. 2 and 6 it is apparent that the size of the coil springs and their compressibility should be fairly accurately estimated with consideration of the elements involved.

The mechanical operations of the invention are as follows:

Assume valve 35 is rotating. Referring to Fig. 7 in which valve 35 is positioned with any one of indentions 36, 37, 38 or 39 in non-cooperating position with inlet passages 20'' and 21'' and the corresponding port 40, 41, 42 or 43. The port is closed by the outer surface 95 of the valve, in which position an explosion of the vaporized fuel in the corresponding cylinder is effected by usual spark plug 96. Further movement of the engine rotates the indention in the valve to the position shown in Fig. 8 permitting upward movement of the piston to discharge the burned gases from within the cylinder through chamber 44'' which extends from the port through exhaust passage 21''. When the piston has reached its upmost position in the cylinder and has covered a short part of its return or downward movement the valve assumes the position shown in Fig. 9 with the indention cooperating with the port and inlet passage 20'' for forming chamber 44' to permit the vaporized fuel to be drawn into the cylinder from the inlet pipe 22 connected to a usual carbureter (not shown). Fig. 10 shows the valve in the position taken after the piston has reached its lowest point in the cylinder and traveled a short distance upwardly whereby surface 95 of the valve completely seals the port thereby maintaining compression of the vaporized fuel within the cylinder previous to its being exploded after which the piston starts on its return downward movement and the indention of the valve assumes the position shown in Fig. 7. As shown in Fig. 2 and in accordance with the usual relative position of the pistons, the indentions 36, 37, 38 and 39 are in staggered relation with each other so that the successive cycles of the cylinders may be accomplished in their regular order.

The valve 35 is rotated by means of shaft 48 being fixed thereto as heretofore explained. End 49 of the shaft is coupled with end 97 of shaft 98 as by milled end portion 99 of shaft 48 being received in groove 100 in end 97 of shaft 98 whereby the clearance distance 101 between ends 49 and 97, respectively, of shafts 48 and 98 permit longitudinal movement of shaft 48 for purposes herein previously and fully explained.

The reciprocal movements of pistons 9, 10, 11 and 12 impart rotary movement to usual crank shaft 102 through usual connecting rods 103, 104, 105 and 106, respectively, connected with pistons 9, 10, 11 and 12 and to the crank shaft. Fixed to the outer end 107 of the crank shaft is gear 108 having rotatable connection with gear 109 (as by timing chain 110) fixed to shaft 98 rotatably mounted in bearings 111 and 112, respectively supported by upwardly extending arms 113 and 114 integrally connected with support 115 fixed to the front 15 of the engine by bolts 116. For the purpose of providing efficient means, other than fan blades 46 for cooling valve 35 I provide water jacket 117 extending around and longitudinally of casing 13, as shown in Figs. 1, 2, 3 and 4, whereby water pump 118 circulates water through pipe 119 into cylinder water jacket 120 and through hole 121 into water jacket 117 and thence into pipe 122 which leads to usual radiator (not shown).

In the exterior surface of valve 35 are a series of groups 123 of circumferentially aligned depressions 124. The groups of depressions are in alignment with the respective upwardly extending recesses 24 in casing 13. The depressions, however, are of slightly less width than the respective recesses 24 whereby oil pump 125 operatively connected with crank shaft 102 is adapted to circulate oil under pressure from oil reservoir 34 in crank case 34' through pipes 26, 27, 30 and 31 and through recesses 24 into the respective depressions 124, while the engine is in cooperation, thereby providing lubrication for bearing 14 of casing 13, as by the lubricant being deposited in depressions 124 and forced into grooves 126 connected with the depresssions. Each groove 126 is sufficiently small to insure the oil remaining therein by adhesion to the valve, whereby during the periods the grooves pass the ports 40, 41, 42 and 43, only negligible quantities of the oil will enter the respective cylinders 5, 6, 7 and 8.

In Fig. 4 I show a modified form of the invention particularly adapted for use with the V-type or twin cylinder internal combustion engine in which valves 35 are arranged above the respective cylinders 127, it being apparent that the various operations of the valves shown in Fig. 4 are similar to the previously described views except that timing chain 128 combinedly rotates the valves 35, and radiator fan 129 through rotation of gear 130 fixed to crank shaft 131.

An advantage of the invention is that carbon which may deposit in indentions 36, 37, 38 and 39 of valve 35 may be quickly and economically scraped from the indentions as by merely removing exhaust pipe 21 after which access may be gained to the indentions for removing the carbon or other foreign matter which may collect in the indentions.

A further advantage of the invention is that considerably more power is adapted to be developed by its use than is capable of being developed in the usual type of internal combustion engine because in addition to the various reasons herein previously pointed out, the size of chambers 44' and 44" may be materially larger than the usual passages for these purposes, whereby the downward and upward movements of the pistons for drawing vaporized fuel into the cylinders and discharging the burned gases therefrom is practically unhampered.

It is apparent that I have invented a practical and highly desirable device for the purposes intended and which may effect various advantageous results, as for instance inner walls of valve 35 forming indentions 36, 37, 38 and 39 extend horizontally and parallel to shaft 48, as shown in Fig. 2, thereby reducing the force of the forward movement of the valve due to the explosions in the cylinders. Furthermore, the force of the explosions within the cylinders are imparted through shaft 48 to bearings 53 and 54, and thence to supports 57 and 58, thereby eliminating the necessity of bearing 14 in casing 13 receiving the pressure force of the explosions, whereby the friction on bearing 14 is considerably less than if the force of the explosions within the cylinders is imparted directly from valve 35 to casing 13, with a result that the compression of springs 62 and 89, respectively shown in Figs. 2 and 6, may not be so great as to cause excessive wear of valve 35 and bearing 14.

While I have chosen to illustrate the forms and constructions of my invention by the herein drawings and explanations of the same, it is understood that the invention resides in the combination, arrangement of the parts and in the details of the construction, as hereinafter claimed. It is further understood that changes in the precise embodiment of the invention, as disclosed herein, can be made within the scope of what is claimed without departing from the spirit of the invention, as other expedients may readily suggest themselves to the art.

What I claim as new and desire to secure by Letters Patent is:

1. The combination with an internal combustion engine, of a tapered rotary valve, resilient means having connections with said valve for maintaining it in its seat, and means for controlling the outward force of said resilient means depending upon the rotatable speed of said engine.

2. The combination with an internal combustion engine, of a tapered rotary valve, a coil spring to maintain said valve in its seat and a governor cooperating with said coil spring whereby substantially uniform pressure of said valve with its seat is effectuated.

3. The combination with an internal combustion engine, of a tapered rotary valve, resilient means to maintain said valve in its seat, a governor cooperating with said resilient means whereby substantially uniform pressure of said valve with its seat is effectuated irrespective of the contraction, expansion and wear of the valve and its bearing, thereby preventing the escape of compressed gases from the cylinder of said engine between said valve and its seat.

4. In an internal combustion engine, the combination with a series of engine cylinders and reciprocating pistons, of a horizontally disposed valve casing formed with inlet and exhaust passages and having ports leading into the engine's cylinders, a rotatably mounted tubular valve in said casing and having depressions therein and having a series of indentions therein adapted to intermittently register with the corresponding said inlet passages, said valve having grooves of considerably less size than the depressions and leading from said depressions across the circumferential path of said indentions to effectively lubricate said valve, exhaust passages and ports whereby an explosive mixture is adapted to be introduced into said cylinders and the burned gases discharged therefrom during the normal operation of said engine, and means to introduce lubricant into said depressions whereby said lubricant is adapted to travel into said grooves.

5. The combination with an internal combustion engine, of a shaft rotatably mounted on said engine and slidable longitudinally, a tubular tapered valve fixed to said shaft and having an indention therein, a valve casing fixed to the block of said engine and rotatably receiving said valve and having a port leading into the cylinder of said engine, and having an inlet passage adapted during the operation of said engine to communicate with said port for admitting fuel into said cylinder, said valve adapted to prevent escape of said fuel from said cylinder during the compression stroke of the piston in said cylinder, said casing having an exhaust passage adapted during the operation of said engine to communicate with said port for discharging gases from said cylinder, a coil spring connected with an end of said shaft and adapted to force said valve to contact with its seat in said casing and permit said valve to slide longitudinally of said casing to compensate for contraction, expansion and wear of said valve and seat, and a governor operatively connected with said coil spring and actuated by said shaft, whereby the compression of said coil spring is automatically regulated to exert required pressure on said valve.

6. The combination with an internal combustion engine, of a shaft rotatably mounted on said engine and slidable longitudinally, a tapered valve fixed to said shaft and having an indention therein, a valve casing fixed to the block of said engine and rotatably receiving said valve and having a port leading into the cylinder of said engine, and having an inlet passage adapted during the operation of said engine to communicate with said port for admitting fuel into said cylinder, said valve adapted to prevent escape of said fuel from said cylinder during the compression stroke of the piston in said cylinder, said casing having an exhaust passage adapted during the operation of said engine to communicate with said port for discharging gases from said cylinder, resilient means connected with said shaft and adapted to force said valve into contact with its seat in said casing and permit said valve to slide longitudinally of said casing to compensate for contraction of said valve and said casing, and a governor operatively connected with said resilient means and actuated by said shaft, whereby the effectiveness of said resilient means is automatically regulated to exert required pressure on said valve.

7. The combination with an internal combustion engine, of a tapered rotary valve having an indention therein, a casing having a tapered bearing rotatably receiving said valve and having a port communicating with the cylinder of said engine and having an inlet passage adapted to communicate with said port for admitting vaporized fuel into said cylinder when said indention is in cooperating position with said inlet passage and said port, and having an exhaust passage capable of communicating with said port for discharging gases from said cylinder when said indention is in cooperating position, and resilient means for maintaining said valve in close contact with said bearing, and means to automatically maintain said resilient means in uniform tension irrespective of the rotatable speed of said valve.

8. The combination with an internal combustion engine, of a tapered rotary valve having an indention in its outer surface, a casing having an exhaust passage and having a tapered bearing rotatably receiving said valve and fixed to the engine block and having a port communicating with the cylinder of said engine and having an inlet passage adapted to communicate with said port for admitting vaporized fuel into said cylinder when said indention is in cooperating position with said inlet passage and said port, and said indention adapted to cooperate with said port and said exhaust passage for permitting the gases to pass from without said cylinder after the explosion cycle of said engine, means for automatically maintaining the outer surface of said valve in close and uniform pressure contact and parallel with the bearing of said casing irrespective of the expansion, contraction and rotatable velocity of said valve thereby preventing the escape of compressed gases between said valve and said bearing from said cylinder, and said valve having a groove in its outer surface and means for introducing lubricant into said groove for lubricating said bearing.

9. The combination with an internal combustion engine, of a tapered rotary valve having an indention therein, a casing having tapered bearing rotatably receiving said valve and having a port communicating with the cylinder of said engine, and having inlet and exhaust passages adapted to individually communicate with said port for admitting vaporized fuel into said cylinder and discharging gases from said cylinder when said port is in cooperating position with said inlet passage and said exhaust passage, respectively, and means for automatically maintaining said valve in uniform contact with the bearing of said casing irrespective of the rotatable speed of said valve and the force of the explosions within said cylinders, thereby preventing the escape of compressed gases between said valve and bearing from said cylinder.

10. The combination with an internal combustion engine, of a tapered rotary valve having an indention therein, a casing having a tapered bearing rotatably receiving said valve and having an exhaust passage therein having communication with the cylinder of said engine and having an inlet passage therein adapted to communicate with said port for admitting vaporized fuel into said cylinder when said indention is in cooperating position with said inlet passage and said port, and said indention adapted to cooperate with said port and said exhaust passage for permitting the gases to pass from said cylinder after the explosion cycle of said engine, resilient means for maintaining said valve in contact with the bearing of said casing for preventing the escape of compressed gases between said valve and bearing from said cylinder, and a governor operatively connected with said resilient means to regulate the pressure of said valve against its bearing.

11. In a multiple cylinder combustion engine, an engine block having multiple cylinders, reciprocating pistons in said cylinders, a casing fixed to said block and having a tapered seat and having ports communicating with said cylinders and having inlet and exhaust passages, tapered rotary valve mounted in said casing and having depressions therein and relatively small grooves leading into said depressions and said valve having indentions in the outer surface adapted to cooperate with the corresponding inlet and exhaust passages and the ports of said casing for effecting operation of said engine, and means to supply oil under pressure to said grooves and said depressions to lubricate the bearing of said valve, and resilient means to maintain said valve in its seat, substantially as described.

12. The combination with an internal combustion engine having a reciprocating piston, of a head having a tapered bearing, a tapered rotary valve seated in said bearing and slidable longitudinally and means operatively connected with said valve to automatically maintain the valve in close contact with said bearing during the various operative conditions of said engine irrespective of the rotatable speed of said valve.

13. The combination with an internal combustion engine having a reciprocating piston, of a head having a tapered bearing, a tapered rotary valve seated in said bearing and means operatively connected with said valve to automatically maintain the valve in uniform contact with said bearing during the various operative conditions of said engine irrespective of the rotatable speed of said valve.

14. The combination with an internal combustion engine having a reciprocating piston, of a head having a tapered bearing, a tapered valve rotatably mounted in said bearing and slidable longitudinally, and resilient means operatively connected with the tapered end of said valve to automatically move said valve longitudinally and in close and uniform contact with its seat or bearing irrespective of the rotatable speed of said valve.

15. The combination with an internal combustion engine having a reciprocating piston, of a head having a bearing, a valve rotatably mounted in said bearing, and means operatively connected with said valve to automatically move said valve longitudinally and in close and uniform contact with its seat or bearing irrespective of the rotatable speed of said valve.

16. The combination with an internal combustion engine having a reciprocating piston, of a head having a tapered bearing, a tapered valve rotatably mounted in said bearing, resilient means operatively connected with said valve to force said valve in close contact with its bearing, and a governor operatively connected with said resilient means to control the force exerted by said resilient means on said valve during the operation of said engine.

17. The combination with an internal combustion engine having a reciprocating piston, of a head having a bearing, a valve rotatably mounted in said bearing, means operatively connected with said valve to force said valve in close contact with its bearing, and a governor operatively connected with said means to control the force exerted by said means on said valve during the operation of said engine.

18. The combination with an internal combustion engine having a reciprocating piston, of a head having a tapered bearing, a tapered valve rotatably mounted in said bearing, means operatively connected with said valve to force said valve in close contact with its bearing, and a governor operatively connected with said means to control the force exerted by said means on said valve during the operation of said engine.

19. The combination with an internal combustion engine, having a reciprocating piston, of a head fixed to said block, a casing fixed to said block and having a tapered bearing seat therein, a tapered valve mounted in said seat, bearings fixed to the engine, a shaft rotatably mounted in said bearings and slidable longitudinally thereof and fixed to said valve whereby said valve is maintained with its walls parallel with said seat, and means to force said valve in uniform contact with its seat, irrespective of the rotatable speed of said engine.

VICTOR F. ZAHODIAKIN.